United States Patent
Arima et al.

(10) Patent No.: US 7,024,919 B2
(45) Date of Patent: Apr. 11, 2006

(54) PRESSURE MEASURING METHOD AND DEVICE

(75) Inventors: Shinichiro Arima, Kumamoto (JP); Noboru Ueda, Kumamoto (JP); Hideo Taira, Kumamoto (JP); Yoshifumi Ohbuchi, Fukuoka (JP); Ippei Torigoe, Kumamoto (JP)

(73) Assignee: AIM Tech Co., Ltd., Kumamoto (JP)

( * ) Notice: Subject to any disclaimer, the term of this patent is extended or adjusted under 35 U.S.C. 154(b) by 3 days.

(21) Appl. No.: 10/496,936
(22) PCT Filed: Nov. 26, 2002
(86) PCT No.: PCT/JP02/12295
  § 371 (c)(1),
  (2), (4) Date: Sep. 7, 2004
(87) PCT Pub. No.: WO03/046502
  PCT Pub. Date: Jun. 5, 2003

(65) Prior Publication Data
  US 2005/0011252 A1 Jan. 20, 2005

(30) Foreign Application Priority Data
  Nov. 27, 2001 (JP) ........................................ 2001-360182

(51) Int. Cl.
  G01M 3/28 (2006.01)
(52) U.S. Cl. .................................... 73/40.5 R; 73/49.1
(58) Field of Classification Search .............. 73/40.5 R, 73/49.1, 49.5
  See application file for complete search history.

(56) References Cited

U.S. PATENT DOCUMENTS 4,608,857 A * 9/1986 Mertens et al. .......... 73/40.5 R
5,610,323 A * 3/1997 Ashworth ................ 73/40.5 R

FOREIGN PATENT DOCUMENTS

| JP | 07-333098 | 12/1995 |
| JP | 09-288031 | 11/1997 |
| JP | 10-09108 | 4/1998 |
| JP | 11-014493 | 1/1999 |
| JP | 2000-214039 | 8/2000 |
| JP | 2001-027576 | 1/2001 |

* cited by examiner

Primary Examiner—Daniel S. Larkin
(74) Attorney, Agent, or Firm—Chapman and Cutler LLP (57) ABSTRACT

The invention provides a pressure measuring method and device that are capable of easily measuring the volume of a pipe that is an object of inspection and of eliminating the influences of a change in temperature in the pipe.

A pressure measuring method using a pressure sensor 4 connected to a pipe for feeding a gas thorough a connecting portion for measuring the pressure in the pipe, the method being characterized in that the method comprises a pressurizing step for pressurizing the inside of the pipe by a pump 5 with the pipe held in the closed state, and a step for measuring an amount of pressure change of the pipe in the standing state after completion of the pressurization step, and in that an amount of pressurization change of the in-pipe pressure fed by the pressurization step, and the flow rate of the gas fed into the pipe during pressurization are measured, and the volume of the pipe in the closed state is calculated on the basis of the amount of pressurization change and the flow rate of the gas, and the amount of leakage of the gas from the pipe is calculated on the basis of the volume of the pipe and the amount of pressure change in the standing state.

29 Claims, 5 Drawing Sheets

PRESSURE MEASURING METHOD AND DEVICE

BACKGROUND OF THE INVENTION

1. Field of the Invention

The present invention relates to a pressure measuring method and device that measure the pressure in a pipe, which are used for diagnosing the condition of the pipe feeding gas or liquid. In particular, it relates to the pressure measuring method and device that detect leakage of a gas or a liquid from the pipe.

2. Related Art Statement

Many pipes are installed in buildings of home and factory, and these are utilized for supplying various gases or various liquids, such as town gas, liquefied petroleum gas, potable water, refrigerant for air conditioning, gas and solution for plant, to every place in a building.

However, by mechanical or chemical action, these pipes may be deteriorated gradually when being used over a long period of time, and possibly there may occur a problem that an opening is generated in a wall of the pipe and a gas or a liquid carried inside the pipe is leaked.

Therefore, periodical leakage inspections of many of these pipes are made compulsory by decree, etc. For example, when consumer uses liquefied petroleum gas (LP gas), an inspection of facilities, such as a pipe, is made compulsory by "Law Concerning the Securing of Safety and the Adequacy of Transaction for Liquefied Petroleum Gas (common name: Liquefied Petroleum Gas Law)".

So far, the leakage inspection of a pipe has been conducted by holding the pipe in the closed state, injecting a gas or a liquid from an inlet, such as a feed opening or an exhaust, that is installed in a part of the pipe and is communicated with the inside of the pipe, making the inside of the pipe higher pressure condition than the outside of the pipe, and then, measuring the pressure change in the pipe beyond the predetermined time.

Then, in the result of the measurement, for example, if it is shown that pressure is on a downward trend, it is assumed that the gas or the liquid is flowing out of the inside of the pipe, and it is judged accordingly that there is an opening, such as crack in a part of the wall of the pipe.

In addition, it takes a different amount of time for an inspection depending on the volume of the pipe that is being inspected. There is a tendency, generally, that the bigger the volume of the pipe is, the longer it takes for inspection.

Moreover, in order to measure the amount of leakage of a gas or a liquid, since it is not possible to calculate only by measuring the pressure change in a pipe, it is necessary to calculate the volume of the pipe in the closed state separately.

However, on the grounds that the volume of the pipe that is an object of inspection cannot be easily measured for real, in case of inspecting a domestic gas piping etc., inspection providers set the measuring time amount by estimating the volume of the pipe experientially or intuitively, and utilize the volume of a pipe calculated based on an engineering-drawing of a pipe work etc. for the measurement of leakage amount. Therefore it makes it difficult to improve the accuracy of the inspection sufficiently.

Furthermore, the pressure change in the pipe held in the closed state is not caused only by leakage, but the pressure changes due to a change in temperature etc. in the pipe.

Therefore, the measurement in consideration of the influences of this temperature change is required for an accurate inspection, however, as there exists no easy-to-use measurement device up to now that can measure the temperature change in a pipe simultaneously with the measurement of the pressure change of the pipe, the measurement has been conducted by selecting the time when a temperature change is small, and it has been the cause of the operation efficiency of the inspection falling remarkably.

The present invention intends to solve the above-mentioned objects and to provide the pressure measuring method and device that are capable of easily measuring the volume of a pipe that is an object of inspection and of eliminating the influences of a change in temperature in the pipe.

Further, as to the pressure measuring device of the present invention, it intends to provide the functions and the structure for preventing the operation of the pressure measuring device from cumbersomeness and the said device from complication, even when adding new functions, such as the measurement of the pipe volume or the elimination of the influences of a change in temperature.

Also, by displaying the past measurement results of each client and enabling the comparison of the present measurement value with the past measurement results, it intends to provide a diverse and novel inspection method of a pipe, with which the longitudinal change can be observed, or on which is based in evaluating the abnormality of the present measurement value, etc.

SUMMARY OF THE INVENTION

In order to solve the above-mentioned problems, the invention has following features. A pressure measuring method which, by the connection to a pipe for feeding a gas or a liquid, measures the pressure in the said pipe, comprises a pressurizing and depressurizing step for pressurizing or depressurizing the inside of the pipe held in the closed state, and a step for measuring an amount of pressure change of the pipe in the standing state after completion of the said pressurizing and depressurizing step, wherein before the said pressurizing and depressurizing step or after completion of the measurement of the amount of pressure change in the standing state, the said pipe is closed after adjusting the in-pipe pressure to the pressure outside the pipe, and the amount of pressure change in the pipe due to a temperature change is measured, and the value of the said amount of pressure change in the standing state is amended in accordance with the said amount of pressure change due to the temperature change, and the influences of the temperature change on the pressure change in the standing state are eliminated.

An additional aspect of the invention has following features. A pressure measuring method which, by the connection to a pipe for feeding a gas or a liquid, measures the pressure in the said pipe, comprises a pressurizing and depressurizing step for pressurizing or depressurizing the inside of the pipe held in the closed state, and a step for measuring an amount of pressure change of the pipe in the standing state after completion of the said pressurizing and depressurizing step, wherein before the said pressurizing and depressurizing step or after completion of the measurement of the amount of pressure change in the standing state, the said pipe is closed after adjusting the in-pipe pressure to the pressure outside the pipe, and the amount of pressure change in the pipe due to a temperature change is measured, an amount of pressurization and depressurization change of the in-pipe pressure by the said pressurizing and depressurizing step or an additional pressurizing and depressurizing step, and the flow rate of the gas or the liquid which is fed into, or discharged from the pipe during the pressurization or the depressurization, are measured, the volume of the pipe in the closed state is calculated on the basis of the said amount of pressurization and depressurization change, and the said flow rate of the gas or the liquid, the value of the said amount of pressure change in the standing state is amended in accordance with the said amount of pressure change due to the temperature change, and the amount of leakage of the gas or the liquid from the pipe is calculated on the basis of the said amended amount of the pressure change in the standing state and the said volume of the pipe.

An additional aspect of the invention has following features. A pressure measuring method which, by the connection to a pipe for feeding a gas or a liquid, measures the pressure in the said pipe, comprises a pressurizing and depressurizing step for pressurizing or depressurizing the inside of the pipe held in the closed state, and a step for measuring an amount of pressure change of the pipe in the standing state after completion of the said pressurizing and depressurizing step, wherein before the said pressurizing and depressurizing step, the said pipe is closed after adjusting the in-pipe pressure to the pressure outside the pipe, and the amount of pressure change in the pipe due to a temperature change is measured, the predicted value of the said amount of pressure change in the standing state is calculated in accordance with the said amount of pressure change due to the temperature change, and leakage condition of the said pipe is judged by comparing the said predicted value with the actually-measured amount of pressure change in the standing state.

An additional aspect of the invention has following feature. The pressure measuring method as described previously is characterized in that at least one of the actually-measured temperature of the gas or the liquid that is fed into a pipe, and the actually-measured temperature of the gas or the liquid that is discharged from the said pipe, is used in calculating the said volume of the pipe.

An additional aspect of the invention has following feature. The pressure measuring method as described previously is characterized in that in measuring the said amount of pressure change in the standing state, the said amount of pressure change is re-amended on the basis of the amount of change of the actually-measured temperature of the gas or the liquid in the pipe, or the actually-measured temperature of the pipe.

An additional aspect of the invention has following feature. The pressure measuring method as described previously is characterized in that when measuring the pressure several times, the said pressurizing and depressurizing step is conducted by doing the pressure measurement in pressurization condition and the pressure measurement in depressurization condition in combination.

An additional aspect of the invention has following feature. The pressure measuring method as described previously is characterized in that the amount of time for measuring the said amount of pressure change of the pipe in the standing state is decided in accordance with the value of the said volume of the pipe.

An additional aspect of the invention has following feature. The pressure measuring method as described previously is characterized in that the said amount of pressure change is calculated by approximating several measurement values by straight line.

An additional aspect of the invention has following feature. A pressure measuring device uses the pressure measuring method as described previously.

An additional aspect of the invention has following feature. The pressure measuring device as described previously includes a pressurizing means for pressurizing the inside of the pipe in the inside of said pressure measuring device.

An additional aspect of the invention has following feature. The pressure measuring device as described previously includes a display part placed in the said pressure measuring device, which displays at least one of the numerical values measured or calculated by the said pressure measuring device, information of operator guidance or operating condition of the said pressure measuring device, and the past result of the measurement or calculation.

An additional aspect of the invention has following feature. The pressure measuring device as described previously includes a memorizing means which accumulates the numerical values measured or calculated.

DETAILED DESCRIPTION OF THE INVENTION

The preferable embodiments of the present invention will be explained hereinafter centering on the pressure measuring device for the leakage inspection of gas piping.

Figure 1:
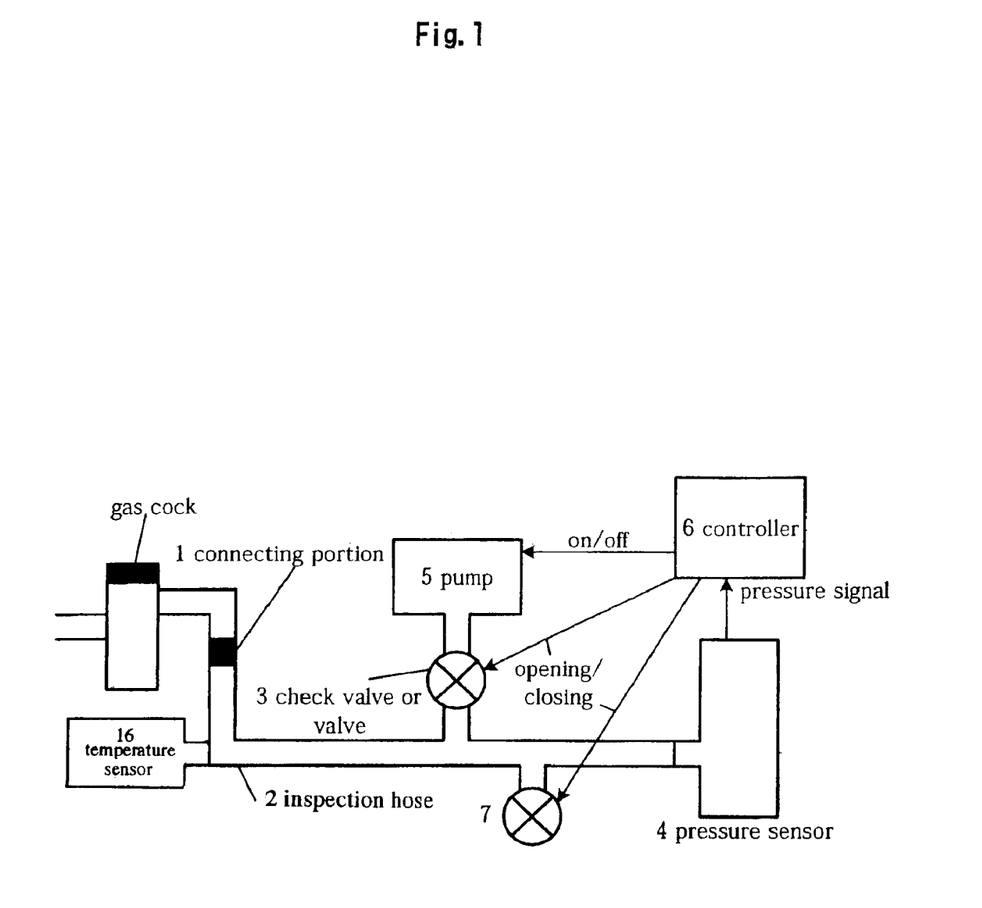
FIG. 1 is a schematic diagram of the pressure measuring device of the present invention.

FIG. 1 is a schematic diagram showing the concept of the mechanical compositions of the pressure measuring device of the present invention.

In the pressure measuring device, the electric pump 5 for supplying air into a pipe, the pressure sensor 4 for measuring the pressure in the pipe, the valve or check valve 3 for controlling the air amount supplied into the pipe, and the valve 7 for equalizing the pressure in the pipe to an atmospheric pressure, are mutually connected and arranged in the coupling structure of the pipe as in FIG. 1.

The inspection hose 2 runs out from the pressure measuring device. In an inspection, as shown in connecting portion 1, the front end of the inspection hose 2 is connected to an exhaust of the gas cock installed in the gas piping that is an object of inspection.

As shown in FIG. 1, by placing a temperature sensor 16 detecting the temperature of a gas in the pipe area closed by the connecting portion 1, the valve or checking valve 3, the valve 7, and the pressure sensor 4, it is possible to measure the temperature of the gas that is fed into pipe area, or discharged from the pipe area, and at the same time, to measure the gas temperature in the pipe when measuring the amount of pressure change.

Also, it is possible to measure the temperature of a pipe directly instead of the temperature measurement of a gas. In this case, the device can be configured to measure the temperature of the pipe by setting a temperature sensor in the contact zone of the pipe and the connecting portion 1, or installing a temperature sensor separately from the body of the pressure measuring device and connecting the said temperature sensor to the pipe that is an object of inspection.

In addition, when conducting an inspection of the pipe with the same volume as the gas piping of general homes, it is more convenient, in carrying and handling it, to incorporate the electric pump 5 into the pressure measuring device. However, if the volume of pipe is large, such as the plant pipe of a factory, it is preferable to install a pressure measuring device and an electric pump separately and to enable the mutual connection of the pipes of each equipment, as the amount of air etc. supplied to the pipe are increased.

The controller 6 performs control of drive of the electric pump 5, control of gating of the valves 3 and 7, and inspections of the pressure signal of the pressure sensor 4. By means of control of the controller 6, the measurement of a pipe volume, the measurement of leakage amount of a pipe, and various inspections of adjustment pressure, combustion pressure, blockade pressure, etc. are practiced as explained hereinafter.

Figure 2:
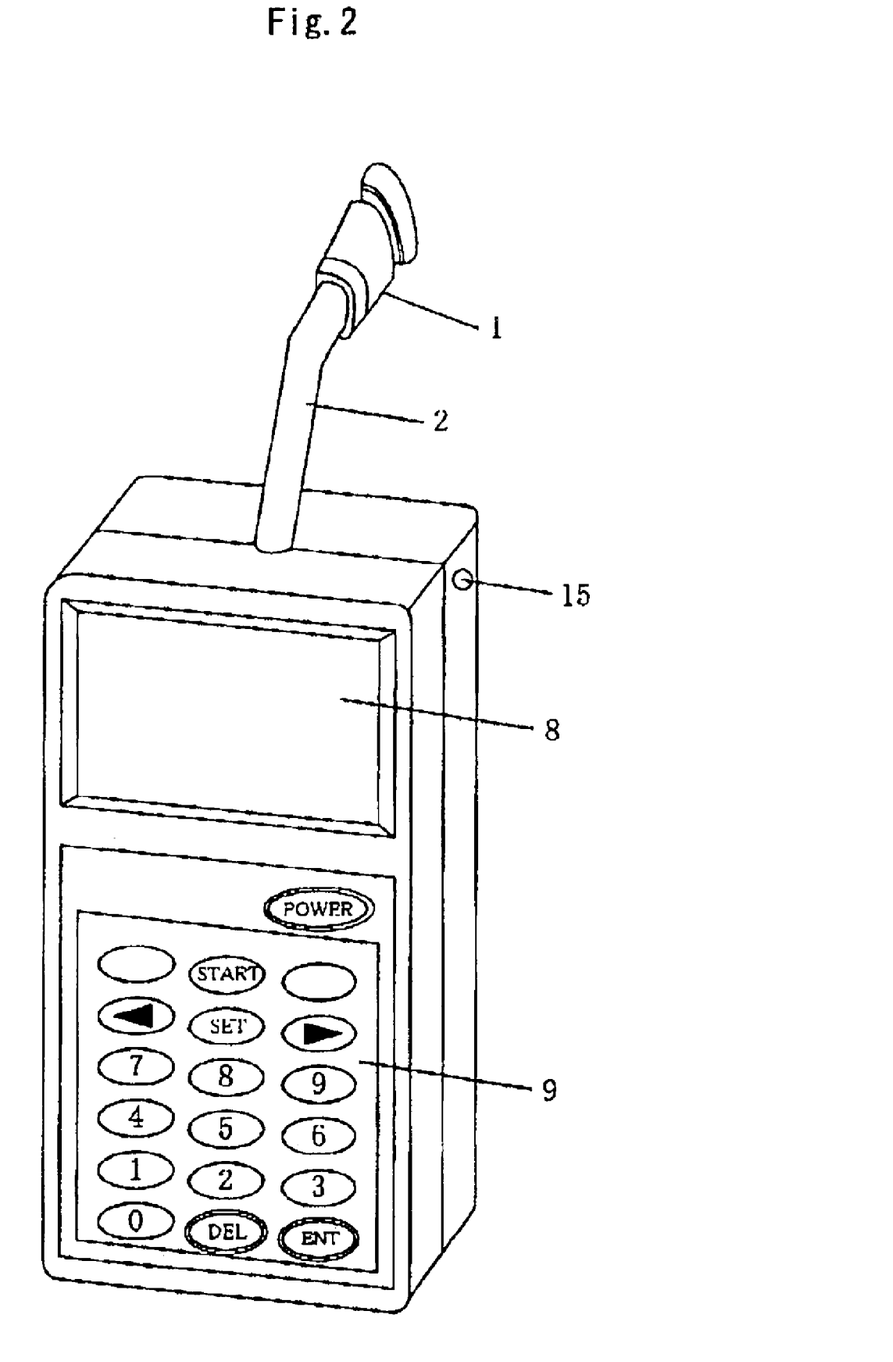
FIG. 2 is an external view of the pressure measuring device of the present invention.

FIG. 2 shows the exterior of a pressure measuring device. However, the pressure measuring device of the present invention is not limited to the exterior shown in FIG. 2. The exterior of it can be changed by modifying according to need, the arrangement and the figuration of various members hereinafter described.

The whole pressure measuring device is in the size that can be held by one hand so that it may be easy for inspection providers to handle.

The keyboard 9 incorporates the liquid crystal display part 8 displaying measurement values, calculation values, graphs of measurement results, and the operating procedure etc., the power source (POWER) key, the starting (START) key, the SET key, the entering (ENT) key, the deleting (DEL) key, numeric keypad, and the navigation key for moving cursors and displays, on the upper side. Selection of an inspection mode, input of customer codes or numeric values, etc. are conducted using the various keys of the said keyboard. In addition, in order to enable the input of various information, the input function of the alphabet and the kana character by utilizing numeric keypad can be added if needed, which is used in cellular phones etc..

It is also possible to make the liquid crystal display part 8 a self-luminous type display unit, such as a display part with backlight or organic electroluminescence display, in preparation for inspecting operation in a dark place.

Also, although not shown in FIG. 2, the measurement results etc. can be printed out by incorporating a printer, such as a thermal printer, integrally into the pressure measuring device if required.

From the topside of the pressure measuring device, the connecting portion 1 connected to the pipe that is an object of inspection protrudes through the inspection hose 2. The shape and the material of the protruding inspection hose 2 is selected by considering the length and ductility of it for easy connection to the pipe inspected, and durability against handling environment. Also, it is possible to attach the connecting means, which is used in most commercially produced stove burners or gas burners, to connecting portion 1, in order that the connecting portion 1 can be attached to the front end of a gas piping at the flip of a switch.

In addition, in case of measuring the adjustment pressure, combustion pressure, and blockade pressure that are legal items of inspection of LP gas, the inspection can be implemented by connecting the front end of connecting portion 1 to a part of pipes that diverge from the pipe connecting between a burning appliance, such as a stove burner, and a gas cock.

15 is an exhaust hole, which is for discharging the gas in a pressure measuring device into air through the valve 7 in FIG. 1. The exhaust hole 15 may be installed wherever on the external case of the pressure measuring device. By opening the valve 7, it is used in case the offset (the atmospheric pressure is set as 0 value) of the pressure sensor 4 is conducted, besides the function for equalizing the pressure in the inspected pipe with the outside pressure (the atmospheric pressure).

Figure 3:
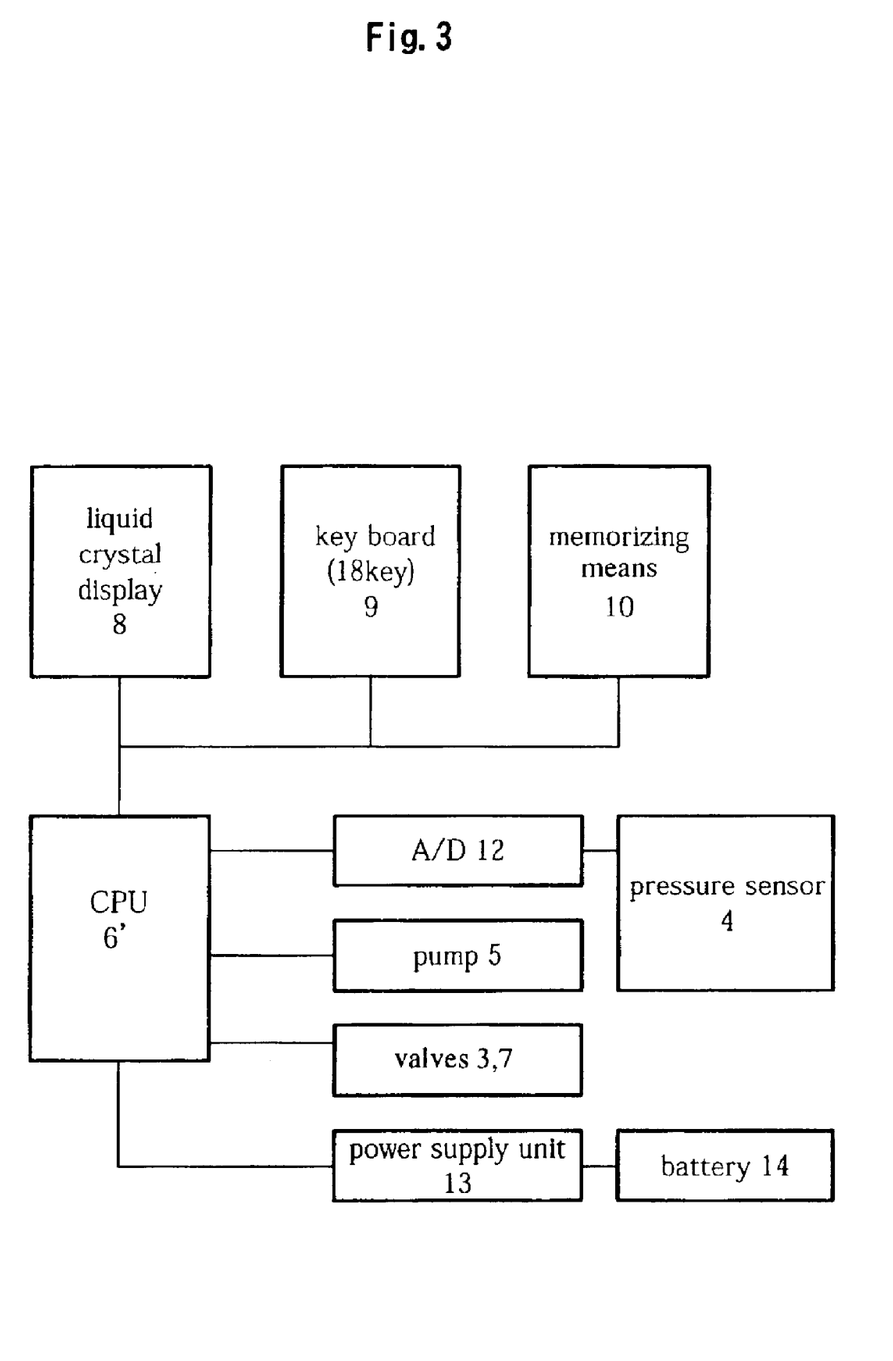
FIG. 3 is a block diagram of the electronic circuitry of the pressure measuring device of the present invention.

FIG. 3 is a block diagram of the electronic circuit in the pressure measuring device.

Driving of the controller 6 is performed along the programs of various inspection modes that are incorporated into CPU 6'.

CPU 6' is supplied with electric power through the power supply unit 13 and the electric power is supplied to pump 5 or valves 3, 7 at the right time by the direction of CPU 6'. In addition, electric power can be introduced from a general household power source as power supply 13 instead of electric battery 14.

The detection signal from the pressure sensor 4 is digitalized through A/D converter 12 and inputted to CPU 6'.

Also, although not shown in FIG. 3, the detection signal from a temperature sensor for measuring the temperature of the gas in a pipe, which is fed into, or discharged from the pipe, or the temperature of the pipe itself, is digitalized through A/D converter 12 and inputted to CPU 6'.

Furthermore, the memorizing means 10 may be configured to accumulate the measurement results of each customer, and then, by retrieving them from CPU 6' if required, to display them on the liquid crystal display part 8, or by communication method such as a cable that is not shown in the figure, to send the data to outside PCs, mobile phones, etc.. Meanwhile, it is also possible to accumulate data in the said memorizing means 10 by downloading them from PC etc..

Next, the algorithm of the leakage inspection used in the pressure measuring method of the present invention will be explained.

If the pressure in a pipe is set as P and the atmospheric pressure of an inspection area is set as $P_0$, the differential pressure ($P-P_0$) in the pipe will generally change as time advances. By measuring the change, the gas leakage from the inside of the pipe is detected.

The time change of the differential pressure ($P-P_0$) in the pipe can be obtained by figuring out the state equation of the gas and it is determined depending on a pump characteristic, a leakage characteristic, and a temperature characteristic in pressurization concerning the differential pressure ($P-P_0$).

The time change curve of the differential pressure ($P-P_0$) in the pipe is expressed with the following fundamental equation.

$$(P-P_0) = (1/D)(Bq_{0inp} \pm \rho_{ini}RE)(1-e^{-Dt}) + (P_{ini}-P_0)e^{-Dt} \qquad (1)$$

Hereinabove, ($P_{ini}-P_0$) is $B=(\rho RT_0/V)$, the initial differential pressure in the pipe, $\rho$ shows a vapor density ($\rho_{ini}$ shows the vapor density of an initial state), R shows a gas constant, $T_0$ shows the environmental temperature (the gas temperature in the pipe) of an inspection area, and V shows the pipe volume.

In addition, it is $D=B(C_+ + C_-)$, which is a parameter relevant to pressurization with a pump, and depressurization by leakage. The pressurizing rate $q_{inp}$ of the pump relevant to a pressurization term can be expressed by deducting the effect term $C_+(P-P_0)$ of the pressurizing-side pressure P from fixed pressurizing rate $q_{0imp}$ of the pump, and it becomes $q_{imp}=q_{0imp}-C_+(P-P_0)$. Also, since the leakage flow rate $q_{out}$ relevant to the term of leakage becomes the value $C_-(P-P_0)$ proportional to the differential pressure, it becomes $q_{out}=C_-(P-P_0)$.

Moreover, as a term relevant to a temperature change, the temperature change is assumed approximately to be linear in the inspection time and is expressed as temperature change inclination $E=|(\Delta T(t)/\Delta t)|$.

The pipe volume can be obtained on the basis of the equation (1). Although an exponential function is obtained as solution here, it approximates the pipe volume up to the secondary term, and the temperature change in pressurization with pump is ignored since the time of pressurization with pump is short. Further, the equation (1) can be transformed to the next equation by applying that the initial differential pressure $(P_{ini}-P_0)$ in a pipe becomes 0 in pressurizing the inside of the pipe from the atmospheric pressure.

$$(P-P_0)=q_{0imp}Bt-(\tfrac{1}{2})q_{0imp}C_+B^2t^2 \qquad (2)$$

Here, the solution of the equation (2) is calculated as to the pipe volume V by setting $(P-P_0)$ to $P_d$, and substituting $B=(\rho RT_0/V)$.

$$V = \{(q_{0imp})(\_RT_0)t + \sqrt{((q_{0imp})(\rho RT_0)t)^2 - 4\times P_d\times(1/2)(q_{0imp}C_+)(\rho RT_0)^2t^2)}\}/2\times P_d \qquad (3)$$

It is made possible to calculate the pipe volume from the equation (3), by specifying beforehand the pressurization characteristic $(q_{0imp}, C_+)$ of a pump using the inspection object that comprises the known pipe volume, and then, measuring pressure differential $P_d$ in pressurization and the pressurization time t in the actual inspection, and incorporating the measurement value. In addition, as to $(\rho RT_0)$, although it is preferable to detect the environmental temperature $T_0$ separately in measuring and to substitute it, it is also possible, in case of simplifying the structure of the device further, to assume $(\rho RT_0)$ to be fixed value and to input it to the pressure measuring device beforehand.

In setting the environmental temperature $T_0$, the actually-measured temperature of the gas fed into a pipe, the actually-measured temperature of the gas discharged from the pipe, or the mean value of above-described two values can be used.

Next, the method for calculating the influences of a temperature change will be explained.

When the pressure in a pipe is equalized to the atmospheric pressure around the pipe and the pipe is held in the closed state, the equation (1) is expressed as follows.

$$(P-P_0)=(1/D)(\pm\rho_{ini}RE)(1-e^{-Dt}) \qquad (4)$$

It is $D=B(C_-)$.

Here, by disregarding the term of leakage, expanding equation (4), which reduces the limit value of D close to zero, into power series of Dt, and putting 0 to D, the next equation will be obtained.

$$(P-P_0)=(\pm\rho_{ini}RE)t \qquad (5)$$

In measurement, the inside of a pipe is adjusted to the atmospheric pressure condition, the pipe is closed, and the pressure change in the pipe within fixed time (for example, about one minute) is measured. The temperature change in the pipe depends on climate condition, however, since it can be assumed to fluctuate with the same period as the temperature fluctuations in a day, it is possible to assume the temperature change in the pipe in a short time to be in a linear state. In addition, on the ground that there is no pressure differential between the inside and the outside of the pipe, it is considered to be in the condition that the influences of leakage can be disregarded, and therefore, the measurement result is that the time change of the in-pipe pressure shows a graph with a certain slope under the influences of the temperature change as in the equation (5).

Since there sometimes occurs, in practice, a rapid temperature change even in the inspection time, it is preferable to measure the pressure change inside a pipe due to a temperature change before and after, or during the leakage inspection of a pipe, and to evaluate the influences of the temperature change frequently. Optimally the influences of the temperature change (the slope of the time change of the in-pipe pressure) measured before and after the leakage inspection correspond to each other, however, even in case they do not correspond, it is possible to evaluate the influences of the temperature change in the leakage inspection by calculating the mean value of the said before and after measurement results (the slope of the time change of the in-pipe pressure), for the purpose of estimating the influences of the temperature change in the leakage inspection.

Next, the method for measuring the amount of leakage will be explained.

The pressure change when pressurizing a pipe to pressure $P_{ini}$ and closing it is expressed by using the equation (1) as follows.

$$(P-P_0)=(1/D)(\pm\rho_{ini}RE)(1-e^{-Dt})+(P_{ini}-P_0)e^{-Dt} \qquad (6)$$

It is $D=B(C_-)$.

The first term of the right-hand side of the equation (6) is the same term as the equation (4), and since the equation (4) can be expressed approximately as the equation (5), the influences of a temperature change is measured separately as described above, the slope $(\pm\rho_{ini}RE)$ expressed in the equation (5) is calculated, and the influences of the temperature change is removed from the above-mentioned equation (6). In particular, if the leakage inspection differential pressure of removing the influences of the temperature change is set as $(P-P_0)^+$, $(P-P_0)^+=(P-P_0)-(\pm\rho_{ini}RE)t$ is calculated. In addition, ± is selected to be + when the temperature change rises and − when the temperature change declines respectively.

Thereby, the equation (6) becomes $(P-P_0)^+=(P_{ini}-P_0)e^{-Dt}$, and therefore, the coefficient $C_-$ (leakage inclination per differential pressure, unit [m³/Pa·s]) of the leakage flow rate $q_{out}$, which determines a leakage amount, can be obtained from the next equation.

$$\ln((P-P_0)^+/(P_{ini}-P_0))=-Dt=-(\rho RT_0/V)(C_-)t \qquad (7)$$

Since the pipe volume V is already calculated, the leakage inclination $C_-$ can be determined by the equation (7). Also, as this leakage inclination $C_-$ per differential pressure is the value at the same time that indicates the amount of leakage, it can also be used as criteria of leakage, and in case the leakage inclination measured has a numeric value above a certain level, it is possible to judge that there occurs leakage.

In addition, if the leakage inclination $C_-$ shows the pressure differential $(P-P_0)$ between the in-pipe pressure P and the atmospheric pressure $P_0$, the leakage flow rate at that time can be determined, and the amount of leakage can be calculated by means of time quadrature of the leakage flow rate. Also, when a gas piping receives the usual adjustment pressure $P_{gas}$, the leakage flow rate is calculated by $C_-(P_{gas}-P_0)$. Accordingly, "the amount of leakage" described in claims has a comprehensive meaning including not only the above-mentioned amount of leakage itself, but also the leakage flow rate, leakage inclination, and the pressure change value due to leakage.

In the leakage inspection of gas piping, the judgment is performed whether leakage has occurred from a pipe, besides the method measuring the amount of leakage, by pressurizing the pipe until fixed pressure, holding it in the closed state, and then, observing the pressure change within the fixed time.

Even in this case, since the pressure in the pipe fluctuates widely due to the influences of a temperature change, an accurate leakage inspection can be realized by evaluating the pressure change by using the above-mentioned leakage inspection differential pressure $(P-P_0)^+$ of removing the influences of the temperature change.

I.e. by measuring how the leakage inspection differential pressure $(P-P_0)^+$ of removing the influences of the temperature change fluctuates after the fixed time on the basis of the differential pressure $(P_{ini}-P_0)$ in initial pressurization, it can be judged that there is leakage if it fluctuates more than the fixed value.

Since the pressure in a pipe is adjusted to be in the atmospheric pressure condition when evaluating the influences of a temperature change as described above, it presents the possibility of amending the atmospheric pressure change, which is the factor affecting the measurement result together with a temperature change in leakage inspection. In other words, since the amount of amendment (correction value under the influences of a temperature change) is measured on the basis of the current atmospheric pressure, and the value itself that changes in accordance with the change of the atmospheric pressure constantly becomes the standard value, the measurement result hardly receives the influences of atmospheric pressure change.

Since the bigger the pipe volume is, the more slowly the pressure changes although it depends on the amount of leakage, it is necessary to implement long-time leakage inspection. In legal items of inspection of LP gas, it is required to take five minutes for the measurement in case the pipe volume is below 2.51 (unit 1: liter) and over ten minutes in case it exceeds 2.51.

Therefore, as it is possible to calculate the pipe volume as mentioned above in the pressure measuring method of the present invention, it presents the possibility of setting up the measurement time amount automatically or displaying or instructing the necessary measurement time amount for inspection providers on the basis of this calculation result, and accordingly, the excessive and useless measurements are eliminated, and an efficient inspection is realized.

As the method for eliminating the influences of a temperature change, it is also possible to measure the temperature of the gas in a pipe directly and to calculate temperature change inclination E in addition to the above-mentioned method.

Also, when measuring the above-described various differential pressures or temperature change inclination, etc., besides the measurement with two points, initial point and terminal point, it is possible to detect the measurement values of more than three points and calculate them by straight-line approximation of a least square, a regression line, etc.

Figure 4:
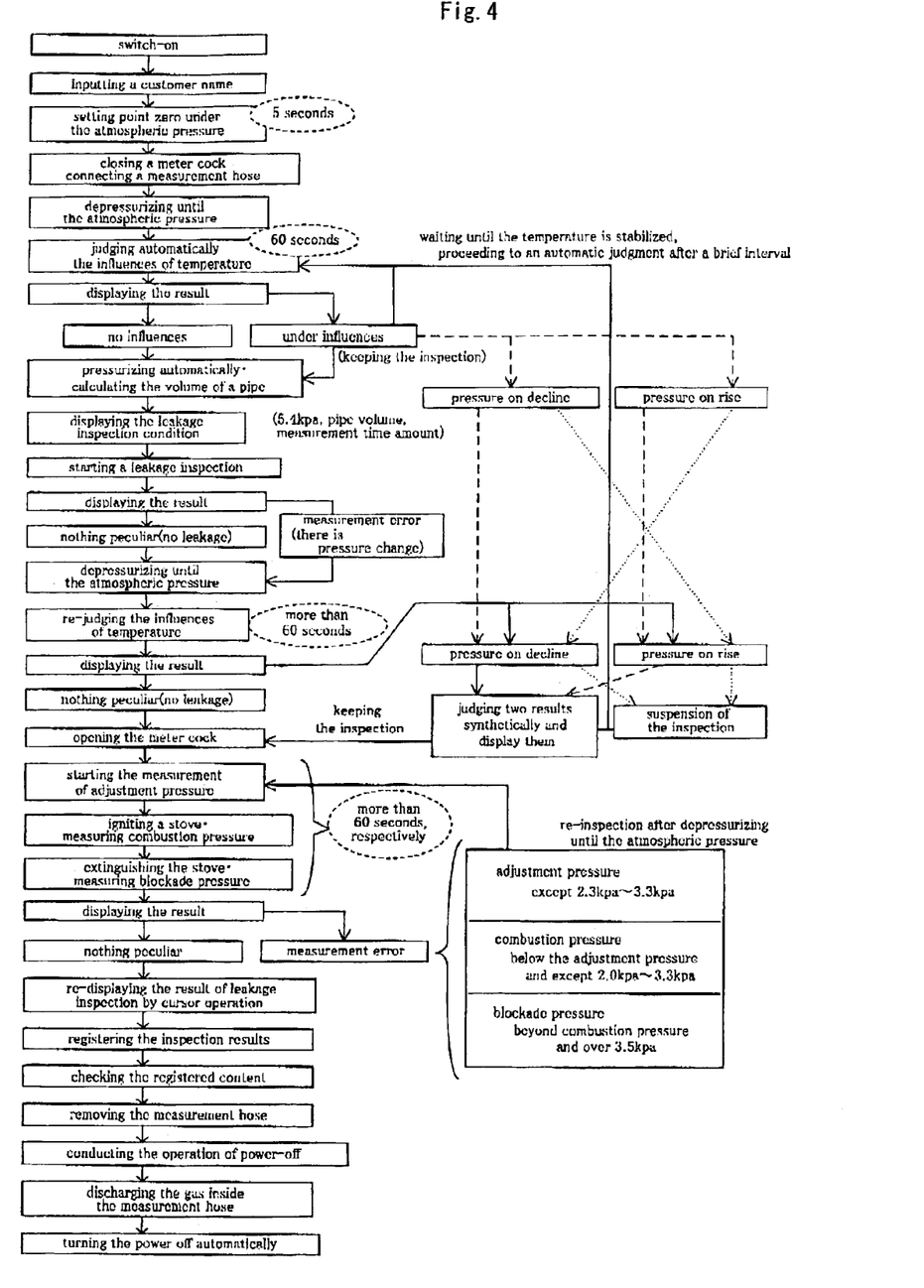
FIG. 4 is a flowchart drawing concerning the operation of the pressure measuring device of the present invention.

Next, one example of the pressure measuring method of the present invention will be explained on the basis of the flow chart of FIG. 4. In each step of the flow chart, the operating instructions, which inspection providers should follow, are arranged to be displayed sequentially in the liquid crystal display part. The pressure measuring device of the present invention is designed so that even someone inexperienced in it can easily handle it.

Firstly, the switch of the power source key of the pressure measuring device is turned on. Although not shown in FIG. 4, the initial setting or selection of various measurement modes, etc. of the pressure measuring device, are already made possible at this moment. General measurement mode is explained in FIG. 4.

Input will be completed, by inputting a customer name or a code and pressing SET key in accordance with the instructions of the liquid crystal display part.

Next, in order to reduce the pressure signal level, that the pressure sensor 4 indicates under the present atmospheric pressure, to zero value, the offset adjustment of the pressure sensor 4 is conducted (for example, a duration is set to about five seconds).

Then, instructions of closing meter cock, or of connecting the connecting portion 1 of the measuring device to the pipe that is an object of inspection, etc. are issued on the display part.

Then, the valve 7 is opened and the pressure in a pipe is equalized to the atmospheric pressure outside the pipe. Instead of this valve 7, by installing a T-shape pipe which is set in a part of the inspection hose 2 and the connecting portion 1 and is communicated with outside, equipping the part of the said T-shape pipe with a manual valve that controls the communication condition with the outside, and then, opening this manual valve, the in-pipe pressure of the pipe that is an object of inspection can be also equalized to the atmospheric pressure.

Then, the valve 7 is closed and the inside of the pipe is held in the closed state. The pressure change in the pipe is measured for about 60 seconds. In the measurement time, an operating condition, such as "measuring a temperature change", a numeric value or a graph of pressure change are displayed on a display part.

After the measurement time, the amount of pressure change is calculated per unit time from the measurement value of the pressure change.

When the said amount of pressure change is within the given value, it is judged that there are no influences of a temperature change (the pressure change in a pipe due to the temperature change in the measurement), and the next step of inspection will be implemented.

When the absolute value of the said amount of pressure change has fluctuated beyond the given value, it is judged that there are influences of a temperature change, and at the same time, it is memorized whether a pressure is on the rise or on the decline. Then, the following step of inspection will be implemented.

With the electric pump 5 driving, and the gating of the valve 3 being controlled, the inside of a pipe is pressurized to the given pressure (usually 5.4 kPa, or it is preferable to add the given pressure to atmospheric pressure in order to eliminate the influences of atmospheric pressure change) by injecting air into the pipe. After completion of the pressurization, the electric pump 5 is promptly stopped and the valve 3 is closed.

And then, by measuring the pressure differential $P_d$ by pressurization and the pressurization time t, and substituting them into the above-mentioned equation (3), the pipe volume V is calculated.

As to the calculation results, the pressure inside a pipe after completion of the pressurization (for example, 5.4 kPa), the pipe volume V, and the measurement time necessary for a leakage inspection (over five minutes or over ten minutes, or the time amount in proportion to a pipe volume) are displayed, and the inspection is initiated. In addition, it is also possible to display numerical values in the measurement, or contents of a measurement being preformed, on the display part.

After completion of the measurement, the amount of pressure change (the amount of pressurization change) per unit time after pressurization is calculated from the measurement value of the pressure change.

Then, in case there are no influences in the judgment of influences of temperature change which was obtained in the above, and also, the amount of pressurization change is within the predetermined amount, (in case there is no pressure change), it is judged that nothing is peculiar (no leakage).

Also, although not shown in the figures, even in case there are influences of temperature change, by subtracting the amount of pressure change due to the influences of temperature change from the above-mentioned amount of pressurization change, it can be judged that nothing is peculiar if the numerical value of the pressure change amount of removing the influences of temperature change, is within the predetermined value.

Also, by calculating the above-mentioned leakage inclination $C_{-}$, not the amount of pressure change itself, it can be judged whether there is leakage or not in accordance with the said leakage inclination value.

In addition, when the measurement time is terminated, the completion of the measurement can be made known by ringing the electronic sound of the speaker that is not shown in the figures. It is also possible that in operating keyboard, in the steps of inputting various data, or at the start and the end of various inspection steps, the electronic sounds ring with the rhythm and pitch of the sound changing if required.

Next, in order to re-inspect the influences of temperature change, once again by opening the valve 7, adjusting the in-pipe pressure to be in the atmospheric pressure condition, and then, holding the pipe in the closed state, the amount of pressure change in the pipe is measured over 60 seconds as the former measurement of the influences of temperature change.

At this point, if both the amount of pressure change at the first time and the second time rise, it is judged whether there is leakage or not in accordance with the numeric value of the amount of pressure change wherein the influences of temperature change is eliminated by calculating the mean value of both the amounts of pressure change and subtracting the said mean value from the amount of pressure change in the leakage inspection. In addition, in case that both the amount of pressure change at the first time and the second time decline, it is processed and judged likewise.

However, if the first time and the second time show different changes (for example, the one shows a rise and the other shows a decline), it is considered to be an invalid inspection and the re-inspection will be implemented from the first measurement of the influences of temperature change.

Next, legal items of inspection will be inspected.

Firstly, it is directed on an display part that the connecting portion 1 of the pressure measuring device should be connected to the pipe (one end of a purpose-built T-shape coupling pipe, or one of the pipes with two gas cocks) which diverges from a part of the pipe connecting the regulator to be inspected and a burning appliance, such as stove burner. Then, the opening of the valve of meter cock and LP gas vessel is instructed. With the condition that gas is fed into the burning appliances being retained, the pressure is measured by means of the pressure sensor 4.

The gas pressure at this point is registered as "adjustment pressure".

Then, it is directed to ignite the burning appliance, and "combustion pressure" that is a gas pressure in combustion is measured.

Finally, "blockade pressure" that is a gas pressure in extinguishing the burning appliance is measured and registered.

It is set out that each pressure measurement time amount takes at least sixty seconds respectively.

It is judged to be normal, in judging conditions of various pressures, when "adjustment pressure" is within 2.3~3.3 kPa, "combustion pressure" is below the adjustment pressure and within 2.0~3.3 kPa, and "blockade pressure" is above the combustion pressure and below 3.5 kPa. The measurement values or the judgment results are displayed on a display part.

When all the inspection items have been completed, it is possible to re-display the results of each leakage inspection and check the contents by pushing the navigation key of keyboard as appropriate.

In addition, in measuring a pipe volume and the legal items of inspection, the past measurement data of the same client can be arranged, by calling it up from the memorizing means 10, to be displayed as reference information and to be contrasted with the present measurement value on display. Accordingly, it can be used as reference of relative judgment whether the present measurement result is within the range of normality or not.

It is possible to check the inspection result, to register it in the memorizing means 10 if required, and also, to call up and display the registered contents again, and check it.

When all the inspections have been finished, it is directed to close the gas cock, to remove the connecting portion 1 from a pipe, etc. and then, to switch off the pressure measuring device. As to switching off the device, it can be arranged to be switched off automatically in case there has been no operation of keyboard, etc. for certain amounts of time.

Besides the above-mentioned pressure measuring method, in order to evaluate the influences of temperature change, the influences of temperature change can be eliminated more accurately by repeating the measurement of the amount of pressure change due to a temperature change for one minute, and the measurement of the amount of pressure change for one minute after pressurization, alternately, and measuring the temperature change within the inspection time amount frequently.

At this point, it is possible to change the repeating frequency in accordance with the pipe volume that is an object of inspection, and to continue until the accumulated amount of the measurement time of the pressure change amount after pressurization becomes the given value (for example, more that five minutes).

Also, the elimination of the influences of temperature change can be applied to various cases, such as the method of subtracting the mean value of the amounts of pressure change due to the influences of the temperature change before and after measuring amount of pressure change after pressurization, from the measured amount of pressure change after pressurization, or the method of subtracting the mean value of all the amounts of pressure change due to the influences of temperature change, from the mean value of all the measured amounts of pressure change after pressurization.

In the above-mentioned pressure measuring method, the pressurizing step for measuring the volume of a pipe is used at the same time as the pressurizing step for a leakage inspection; however, a pressurizing step can be installed separately for measuring the volume of a pipe.

Moreover, in case of measuring the volume of a pipe, it is also possible to measure the temperature of the gas fed into a pipe, or discharged from the pipe, directly by means of a temperature sensor, and to use it as the environmental temperature $T_0$.

In addition, if the pipe volume is known beforehand, the numeric value of the said pipe volume can be inputted from KEY board without measuring it, and used for a leakage inspection etc..

Although the case of pressurizing the inside of a pipe was exemplified in the above-mentioned pressure measuring method, it is also possible to measure the pipe volume or the leakage amount likewise by depressurizing the inside of the pipe (putting the inside of the pipe into a negative pressure condition).

Also, by combining the measurements in pressurization and depressurization, for example, after it is judged that there is a leakage by means of the pressurization measurement, it is possible to rejudge it by implementing the depressurization measurement.

In addition, "a pressurizing and depressurizing step" as in claims means "a step for pressurizing or a step for depressurizing".

In the above-mentioned pressure measuring method, leakage can be judged only after the completion of the measurement of the pressure change amount in a leakage inspection. Therefore, by using the value of the pressure change amount that measured the influences of the temperature change before the leakage inspection, predicting the pressure change amount in the leakage inspection after pressurization (calculate the change amount in case there is no leakage, and the change amount within the limits of what is allowed as a measurement deviation against the said change amount), and comparing the said predicted value with the actually-measured pressure change amount after pressurization, the judgment of leakage is possible at any time in the leakage inspection.

Furthermore, in the above-mentioned pressure measuring method, the amount of pressure change due to the influences of a temperature change is measured before and after the leakage inspection in order to remove the influences of a temperature change. However, as there occurs a temperature change even in the leakage inspection (not only in the leakage inspection but also in the inspections of adjustment pressure, combustion pressure, blockade pressure, etc.), in order to ensure more accurate inspection, it is also possible to measure the gas temperature inside a pipe, or the temperature of the pipe, in the leakage inspection directly by means of a temperature sensor, and to calculate temperature change inclination E.

Also, by using the measurement of the pressure change amount due to the influences of a temperature change and the measurement by means of a temperature sensor together, it presents the possibilities, such as to amend the value of the pressure change amount due to the temperature change by using the value measured by the temperature sensor, or, even in case the above-mentioned predicted value differs significantly from the actually-measured pressure change amount after pressurization, to judge accurately by using the measured value of said temperature sensor whether the difference between the predicted value in the temperature change and actually-measured value is due to a temperature change or a leakage.

Figure 5:
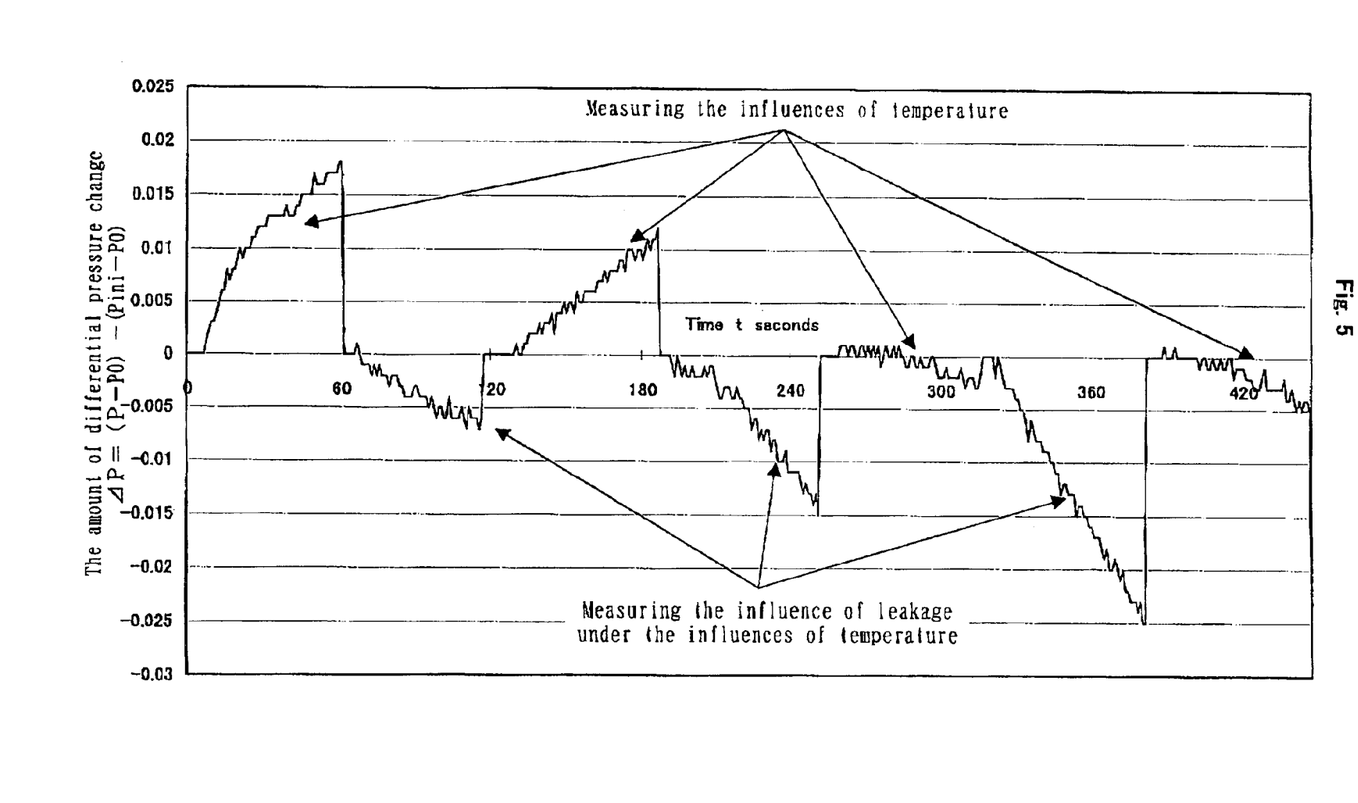
FIG. 5 is an example of the measurement result by the pressure measuring device of the present invention.

The example of the measurement result by the pressure measuring device of the present invention is shown in FIG. 5.

The pipe to be inspected was measured with the settings that a hole for leakage was made in a part of the pipe, which was heated gradually for about 180 seconds from the beginning, and after the fixed temperature was maintained until around 360 seconds, the temperature was lowered.

The horizontal axis of the graph in FIG. 5 represents time, and the vertical axis represents the amount of differential pressure change ($P-P_{ini}$) between the differential pressure of the pressure P inside a pipe and the atmospheric pressure $P_0$, and the differential pressure of the initial pressure $P_{ini}$ and the atmospheric pressure $P_0$.

Accordingly, when measuring the influences of a temperature change, it is $P_{ini}=P_0$. For example, in the leakage inspection after pressurization, it is $P_{ini}=5.4$ kPa.

As in the graph of FIG. 5, the amount of pressurization change in the leakage inspection differs in accordance with the temperature change, and it is apparent that it enables the measurement to follow the temperature change. With the existing pressure measuring devices, which does not take a temperature change into consideration, the leakage inspection of a pipe like this was entirely difficult.

Not being limited to the pressure measuring method and device explained hereinabove, the present invention enables one to display graphically on the display part and select numeric value display or graphic display, and to select the digit number of displayed value, for example, in 0.02 kPa unit that is designated by law, bigger or smaller unit than it. Also, it enables the input of an operating schedule or the register of an inspecting date and hour by adding a displaying function of calendar and clock.

Thus, it goes without saying that various functions utilized in the existing electronics devices can be added to the present invention if required.

In addition, in the embodiments of the present invention, a gas piping was centrally explained, however, it is possible to apply pipes feeding other gases or liquids. Moreover, although it was exemplified that gas was injected to a pipe for pressurizing the inside of the pipe, liquid can be also injected. In this case, of course each measurement is implemented by taking into consideration the difference of the condition and the characteristics of gas and liquid.

INDUSTRIAL APPLICABILITY

The present invention enables not only the appropriateness of inspection time, but also the accurate calculation of leakage amount as it can measure the volume of a pipe easily.

In addition, since the elimination of the influences of a temperature change is made possible, it enables an accurate leakage inspection even when and where a rapid environmental change occurs.

Moreover, by incorporating an electric pump, as a pressurizing means, into the pressure measuring device, portability and operationality are improved, and by displaying not only the numerical value measured or calculated, but also operation instructing information or operating condition, it presents the possibility for even inexperienced inspection providers to handle it easily.

Further, as it has functions, such as calling up the past measurement results and accumulating the necessary measurement results, a variety of forms of utilization concerning the pressure measuring device are possible.

What is claimed is:

1. A pressure measuring method which, by connection to a pipe for feeding a gas or a liquid, measures pressure in said pipe, comprising a pressurizing and depressurizing step for pressurizing or depressurizing the inside of the pipe held in a closed state, and a measuring step for measuring an amount of pressure change of the pipe in a standing state after completion of said pressurizing and depressurizing step, wherein, before said pressurizing and depressurizing step, said pipe is closed after adjusting in-pipe pressure to match pressure outside the pipe, and an amount of pressure change in the pipe due to temperature change is measured, and a value of said amount of pressure change in the standing state is amended in accordance with said amount of pressure change due to the temperature change, and influences of the temperature change on the pressure change in the standing state are eliminated.

2. The pressure measuring method as claimed in claim 1, wherein, in measuring said amount of pressure change in the standing state, said amount of pressure change is re-amended on the basis of an amount of change of actually-measured temperature of the gas or the liquid in the pipe, or actually-measured temperature of the pipe.

3. The pressure measuring method as claimed in claim 1, wherein, when measuring pressure several times, said pressurizing and depressurizing step is conducted by performing pressure measurement in pressurization condition and pressure measurement in depressurization condition in combination.

4. The pressure measuring method as claimed in claim 1, wherein said amount of pressure change is calculated by approximating several measurement values by straight line.

5. A pressure measuring method which, by the connection to a pipe for feeding a gas or a liquid, measures the pressure in the said pipe, comprising a pressurizing and depressurizing step for pressurizing or depressurizing the inside of the pipe held in the closed state, and a step for measuring an amount of pressure change of the pipe in the standing state after completion of the said pressurizing and depressurizing step, wherein;

before the said pressurizing and depressurizing step or after completion of the measurement of the amount of pressure change in the standing state, the said pipe is closed after adjusting the in-pipe pressure to the pressure outside the pipe, and the amount of pressure change in the pipe due to a temperature change is measured, an amount of pressurization and depressurization change of the in-pipe pressure by the said pressurizing and depressurizing step or an additional pressurizing and depressurizing step, and the flow rate of the gas or the liquid which is fed into, or discharged from the pipe during the pressurization or the depressurization, are measured, the volume of the pipe in the closed state is calculated on the basis of the said amount of pressurization and depressurization change, and the said flow rate of the gas or the liquid, the value of the said amount of pressure change in the standing state is amended in accordance with the said amount of pressure change due to the temperature change, and the amount of leakage of the gas or the liquid from the pipe is calculated on the basis of the said amended amount of the pressure change in the standing state and the said volume of the pipe.

6. The pressure measuring method as claimed in claim 5, wherein; at least one of the actually-measured temperature of the gas or the liquid that is fed into a pipe, and the actually-measured temperature of the gas or the liquid that is discharged from the said pipe, is used in calculating the said volume of the pipe.

7. The pressure measuring method as claimed in claim 5, wherein an amount of time for measuring said amount of pressure change of the pipe in the standing state is decided in accordance with the value of said volume of the pipe.

8. The pressure measuring method as claimed in claim 5, wherein, in measuring said amount of pressure change in the standing state, said amount of pressure change is re-amended on the basis of an amount of change of actually-measured temperature of the gas or the liquid in the pipe, or actually-measured temperature of the pipe.

9. The pressure measuring method as claimed in claim 5, wherein, when measuring pressure several times, said pressurizing and depressurizing step is conducted by performing pressure measurement in pressurization condition and pressure measurement in depressurization condition in combination.

10. The pressure measuring method as claimed in claim 5, wherein said amount of pressure change is calculated by approximating several measurement values by straight line.

11. A pressure measuring method which, by the connection to a pipe for feeding a gas or a liquid, measures pressure in said pipe, comprising a pressurizing and depressurizing step for pressurizing or depressurizing the inside of the pipe held in a closed state, and a measuring step for actually measuring an amount of pressure change of the pipe in a standing state after completion of said pressurizing and depressurizing step, wherein, before said pressurizing and depressurizing step, said pipe is closed after adjusting in-pipe pressure to match pressure outside the pipe, and an amount of pressure change in the pipe due to temperature change is measured, a predicted value of said amount of pressure change in the standing state is calculated in accordance with said amount of pressure change due to temperature change, and leakage condition of said pipe is judged by comparing said predicted value with the actually-measured amount of pressure change in the standing state.

12. The pressure measuring method as claimed in claim 11, wherein, in measuring said amount of pressure change in the standing state, said amount of pressure change is re-amended on the basis of an amount of change of actually-measured temperature of the gas or the liquid in the pipe, or actually-measured temperature of the pipe.

13. The pressure measuring method as claimed in claim 11, wherein, when measuring pressure several times, said pressurizing and depressurizing step is conducted by performing pressure measurement in pressurization condition and pressure measurement in depressurization condition in combination.

14. The pressure measuring method as claimed in claim 11, wherein said amount of pressure change is calculated by approximating several measurement values by straight line.

15. A pressure measuring device performing a pressure measuring method which, by connection to a pipe for feeding a gas or a liquid, measures pressure in said pipe, comprising means for pressurizing or depressurizing the inside of the pipe held in a closed state, and means for measuring an amount of pressure change of the pipe in a standing state after completion of said pressurizing and depressurizing step, wherein, before said pressurizing and depressurizing step, said pipe is closed after adjusting in-pipe pressure to match pressure outside the pipe, and an amount of pressure change in the pipe due to temperature change is measured, and a value of said amount of pressure change in the standing state is amended in accordance with said amount of pressure change due to the temperature change, and influences of the temperature change on the pressure change in the standing state are eliminated.

16. The pressure measuring device as claimed in claim 15, further comprising a pressurizing means for pressurizing the inside of the pipe in the inside of said pressure measuring device.

17. The pressure measuring device as claimed in claim 16, further comprising a display part placed in said pressure measuring device, which displays at least one of numerical values measured or calculated by said pressure measuring device, information of operator guidance or operating condition of said pressure measuring device, and past result of measurement or calculation.

18. The pressure measuring device as claimed in claim 16, further comprising a memorizing means which accumulates numerical values measured or calculated.

19. The pressure measuring device as claimed in claim 15, further comprising a display part in said pressure measuring device, which displays at least one of numerical values measured or calculated by said pressure measuring device, information of operator guidance or operating condition of said pressure measuring device, and past result of measurement or calculation.

20. The pressure measuring device as claimed in claim 19, further comprising a memorizing means which accumulates numerical values measured or calculated.

21. The pressure measuring device as claimed in claim 15, further comprising a memorizing means which accumulates numerical values measured or calculated.

22. A pressure measuring method which, by connection to a pipe for feeding a gas or a liquid, measures pressure in said pipe, comprising a pressurizing and depressurizing step for pressurizing or depressurizing the inside of the pipe held in a closed state, and a measuring step for measuring an amount of pressure change of the pipe in a standing state after completion of said pressurizing and depressurizing step, wherein, after completion of the measurement of the amount of pressure change in the standing state, said pipe is closed after adjusting in-pipe pressure to match pressure outside the pipe, and an amount of pressure change in the pipe due to temperature change is measured, and a value of said amount of pressure change in the standing state is amended in accordance with said amount of pressure change due to the temperature change, and influences of the temperature change on the pressure change in the standing state are eliminated.

23. The pressure measuring method as claimed in claim 22, wherein, in measuring said amount of pressure change in the standing state, said amount of pressure change is re-amended on the basis of an amount of change of actually-measured temperature of the gas or the liquid in the pipe, or actually-measured temperature of the pipe.

24. The pressure measuring method as claimed in claim 22, wherein, when measuring pressure several times, said pressurizing and depressurizing step is conducted by performing pressure measurement in pressurization condition and pressure measurement in depressurization condition in combination.

25. The pressure measuring method as claimed in claim 22, wherein said amount of pressure change is calculated by approximating several measurement values by straight line.

26. A pressure measuring device performing a pressure measuring method which, by connection to a pipe for feeding a gas or a liquid, measures pressure in said pipe, comprising means for pressurizing or depressurizing the inside of the pipe held in a closed state, and means for measuring an amount of pressure change of the pipe in a standing state after completion of said pressurizing and depressurizing step, wherein, after completion of measurement of the amount of pressure change in the standing state, said pipe is closed after adjusting in-pipe pressure to match pressure outside the pipe, and an amount of pressure change in the pipe due to temperature change is measured.

27. The pressure measuring device as claimed in claim 26, further comprising a pressurizing means for pressurizing the inside of the pipe in the inside of said pressure measuring device.

28. The pressure measuring device as claimed in claim 26, further comprising a display part placed in said pressure measuring device, which displays at least one of numerical values measured or calculated by said pressure measuring device, information of operator guidance or operating condition of said pressure measuring device, and past result of measurement or calculation.

29. The pressure measuring device as claimed in claim 26, further comprising a memorizing means which accumulates numerical values measured or calculated.

* * * * *